United States Patent [19]
Cook et al.

[11] Patent Number: 5,413,082
[45] Date of Patent: May 9, 1995

[54] CANISTER PURGE SYSTEM HAVING IMPROVED PURGE VALVE

[75] Inventors: John E. Cook; Gary M. Everingham, both of Chatham, Canada

[73] Assignee: Siemens Electric Limited, Chatham, Canada

[21] Appl. No.: 184,094

[22] Filed: Jan. 19, 1994

[51] Int. Cl.⁶ ............................................. F02M 37/04
[52] U.S. Cl. .................................. 123/520; 123/458
[58] Field of Search .............. 123/458, 520, 519, 518, 123/516; 251/129.09

[56] References Cited

U.S. PATENT DOCUMENTS

| | | | |
|---|---|---|---|
| 4,026,258 | 5/1977 | Ino | 123/520 |
| 4,583,509 | 4/1986 | Schecter | 123/520 |
| 4,610,233 | 9/1986 | Kushida | 123/488 |
| 4,901,702 | 2/1990 | Beicht | 123/520 |
| 5,117,797 | 6/1992 | Telep | 123/520 |
| 5,226,398 | 7/1993 | Cook | 123/520 |
| 5,237,980 | 8/1993 | Gillier | 123/458 |
| 5,249,561 | 10/1993 | Thompson | 123/520 |
| 5,259,354 | 11/1993 | Sausner | 123/520 |
| 5,284,121 | 2/1994 | Abe | 123/520 |

*Primary Examiner*—Carl S. Miller
*Attorney, Agent, or Firm*—George L. Boller; Russel C. Wells

[57] ABSTRACT

The valve has a one-piece guide and valve seat member and a one-piece valve member that is guided by a bushing lining the guide of the guide and seat member. The valve is operated by a duty-cycle modulated waveform, and when the valve is operated in the closing direction, a gap is introduced into the waveform. The valve head and valve seat are configured to cause sonic flow through the valve when the valve is open and the pressure differential across it exceeds a certain minimum.

7 Claims, 3 Drawing Sheets

POWER DRIVE SIGNAL STRATEGY (MINIMUM PULSE
WIDTH CHANGE 5%)

5,413,082

CANISTER PURGE SYSTEM HAVING IMPROVED PURGE VALVE

FIELD OF THE INVENTION

This invention relates to on-board evaporative emission control systems for internal combustion engine powered motor vehicles. Such systems comprise a vapor collection canister that collects fuel vapor emitted from a tank containing volatile liquid fuel for the engine and a purge valve for periodically purging collected vapor to an intake manifold of the engine.

BACKGROUND AND SUMMARY OF THE INVENTION

Contemporary systems typically comprise a solenoid-operated purge valve that is under the control of a purge control signal generated by a microprocessor-based engine management system. A typical purge control signal is a duty-cycle modulated pulse waveform having a relatively low frequency, such as 10 Hz. The modulation ranges from 0% to 100%. The response of certain conventional solenoid-operated purge valves is sufficiently fast that the valve follows to some degree the pulsing waveform that is being applied to it, and this causes the purge flow to experience similar pulsations. Such pulsations may at times be detrimental to tailpipe emission control objectives since such pulsing vapor flow to the intake manifold may create objectionable hydrocarbon spikes in the engine exhaust. Changes in intake manifold vacuum that occur during normal operation of a vehicle may also act directly on the valve in a way that upsets the control strategy unless provisions are made to take their influence into account, such as by including a vacuum regulator valve. Moreover, low frequency pulsation may produce audible noise that may be deemed disturbing.

It is known that maintenance of sonic flow will make a purge system quite insensitive to typical fluctuations in engine intake manifold vacuum that occur during engine operation. However, insofar as the applicants are aware, the possibility of maintaining sonic flow by configuring the canister purge valve's head and seat to cause sonic flow when the valve is open and the positive pressure across it is in excess of a certain minimum has not heretofore been recognized. Accordingly, a general aspect of the invention is to provide a canister purge system incorporating such a valve. More specific aspects relate to various constructional features, and some of these features may be useful in canister purge systems and valves that do not necessarily employ the novel valve head and seat for achieving and maintaining sonic flow in a canister purge system and valve.

The present invention also relates to an improved purge valve for an evaporative emission control system characterized by improved linearity and insensitivity to variations in intake manifold vacuum communicated to the valve so that better control of canister purging can be achieved. In addition to improvements that reside in constructional features of the purge valve, improvements reside in how it is operated by the purge control signal, particularly when the valve is to operate in the direction of closing. An important advantage of the inventive valve is that an additional vacuum regulator valve becomes unnecessary in view of the sonic flow characteristic of the inventive valve.

The foregoing, along with additional features, and other advantages and benefits of the invention will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
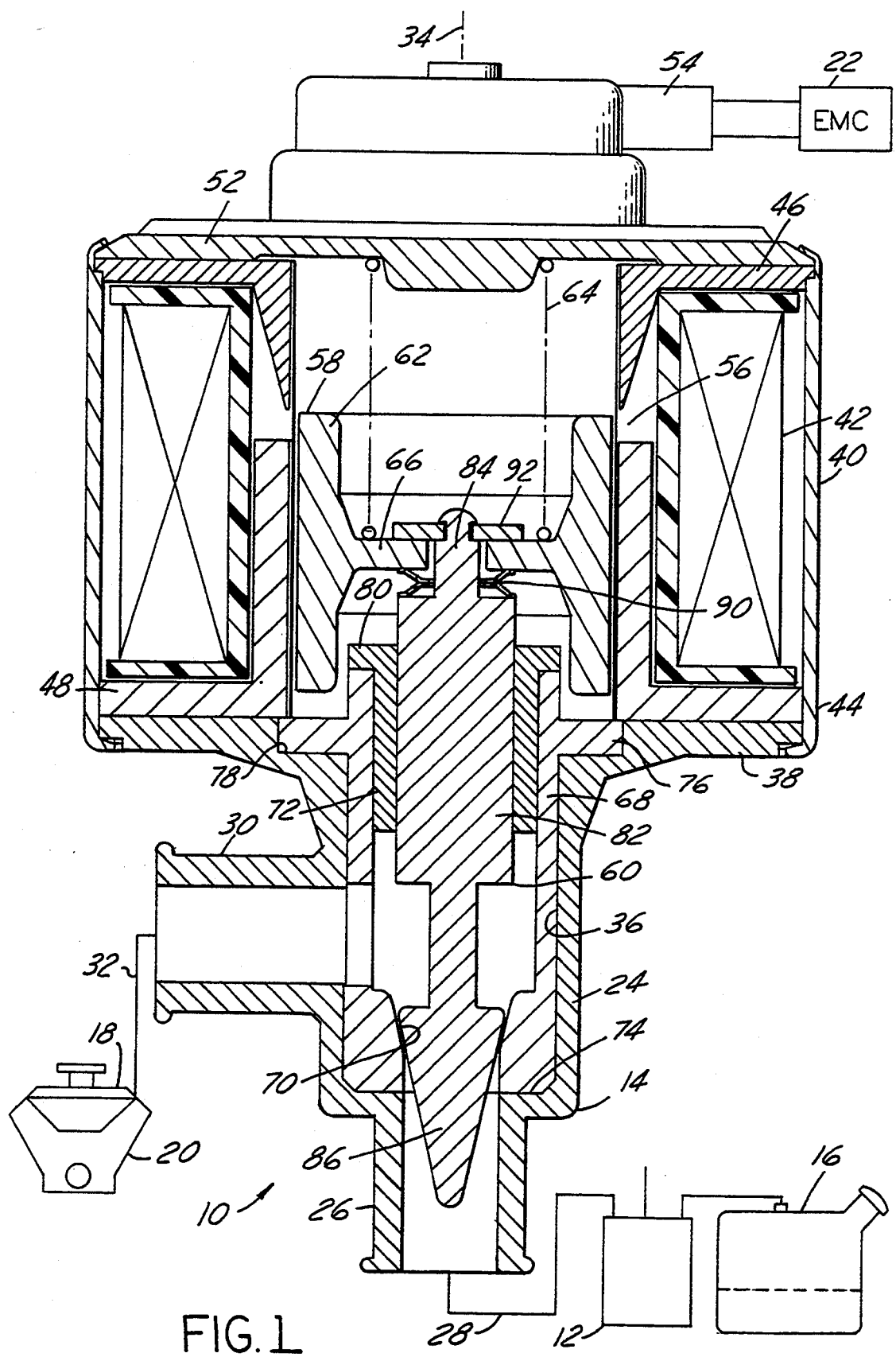
FIG. 1 is a longitudinal cross-sectional view through a canister purge solenoid valve embodying principles of the invention and showing the valve in association with an evaporative emission control system.

An evaporative emission control system 10 of a motor vehicle comprises a vapor collection canister 12 and a canister purge solenoid valve 14 connected in series between a fuel tank 16 and an intake manifold 18 of an internal combustion engine 20 in the customary fashion. An engine management computer 22 supplies a purge control signal for operating valve 14.

Valve 14 comprises a body 24 having an inlet port 26 that is coupled via a conduit 28 with canister 12 and an outlet port 30 that is coupled via a conduit 32 with intake manifold 18. Canister purge solenoid valve 14 has a longitudinal axis 34, and body 24 comprises a through-bore 36 that is coaxial with axis 34 and that includes inlet port 26. Outlet port 30 intercepts the wall of body 24 perpendicular to axis 34 so that port 30 and port 26 are at a right angle to each other proximate one longitudinal end of body 24.

The opposite longitudinal end comprises a radially outwardly directed circular flange 38 to which a solenoid 40 coaxial with axis 34 is attached in a manner that encloses that end of body 24. Solenoid 40 comprises a bobbin-mounted coil 42 and associated stator structure 44. The latter comprises pole pieces 46, 48 that are associated with opposite axial ends of coil 42, as shown, and a cylindrical casing 50 that bounds the outside of coil 42 between the radially outer margins of pole pieces 46, 48. Casing 50 also serves to hold parts of solenoid 40 together by having its lower margin crimped around the edge of flange 38 and its upper margin crimped around the edge of an end cap 52 that closes the far longitudinal end and that contains an electrical connector 54 having terminals to which leads from coil 42 are wired and to which engine management computer 22 is connected. The stator structure 44 further comprises an air gap 56 radially inwardly of the bobbin wall of coil 42.

An armature 58 is disposed radially inwardly of pole pieces 46, 48 proximate air gap 56, and a valve member 60 is joined to armature 58 at the center thereof. Armature 58 comprises a generally cylindrical tube 62 with a transverse wall 66 spanning its interior about half-way along its length. It is to wall 66 that one end of valve member 60 is joined. A helical compression spring 64 is disposed between the inside of end cap 52 and the confronting face of wall 66 for biasing armature 58 and valve member 60 in the longitudinal direction toward port 26.

A tubular one-piece seat and guide member 68 is fitted to throughbore 36. It has a circular cylindrical sidewall and comprises a tapered valve seat 70 at the longitudinal end which is disposed proximate port 26. The longitudinally opposite end forms a guide that is lined by a circular cylindrical bushing 72 for guiding the longitudinal motion of valve member 60 when the valve is operated. The end of member 58 proximate port 26 fits against a shoulder 74 of body 24. Proximate its opposite end, member 58 comprises a circular flange 76 that fits against a shoulder 78 of body 24. The insertion of bushing 72 into member 68 is set by a flange 80 fitting against the edge of member 68.

Valve member 60 is one-piece and comprises a cylindrical stem 82 that fits closely within the bore of bushing 72. The stem is diametrically reduced at 84 to provide for attachment to armature 58 while at the opposite end, it is diametrically reduced prior to an integral tapered valve head 86 at that end of the valve member. Head 86 is shaped for cooperation with the tapered valve seat. The attachment of valve member 60 to armature 58 comprises a joint that allows small radial displacement of the armature relative to the valve member, but without any axial separation. Valve member 60 is strictly guided by the close, but lubrous, fit with bushing 72. The attachment involves fitting a multi-fingered spring 90 between wall 66 and a shoulder of member 60, placing a washer 92 on the opposite side of wall 64, and then riveting the tip end of member 60 to capture the assembled parts. The rate of spring 90 is significantly more than that of spring 64.

FIG. 1 shows the closed position where the valve seats on the seat to block flow between ports 26 and 30. When the solenoid coil is progressively energized by current, armature 58 is pulled upwardly against the opposing spring force to unseat the valve from the seat and open the valve so that flow can occur between ports 26 and 30. The degree of valve opening depends on the magnitude of current flow through coil 42 so that by controlling the current flow, the purge flow through the valve is controlled.

Figure 4:
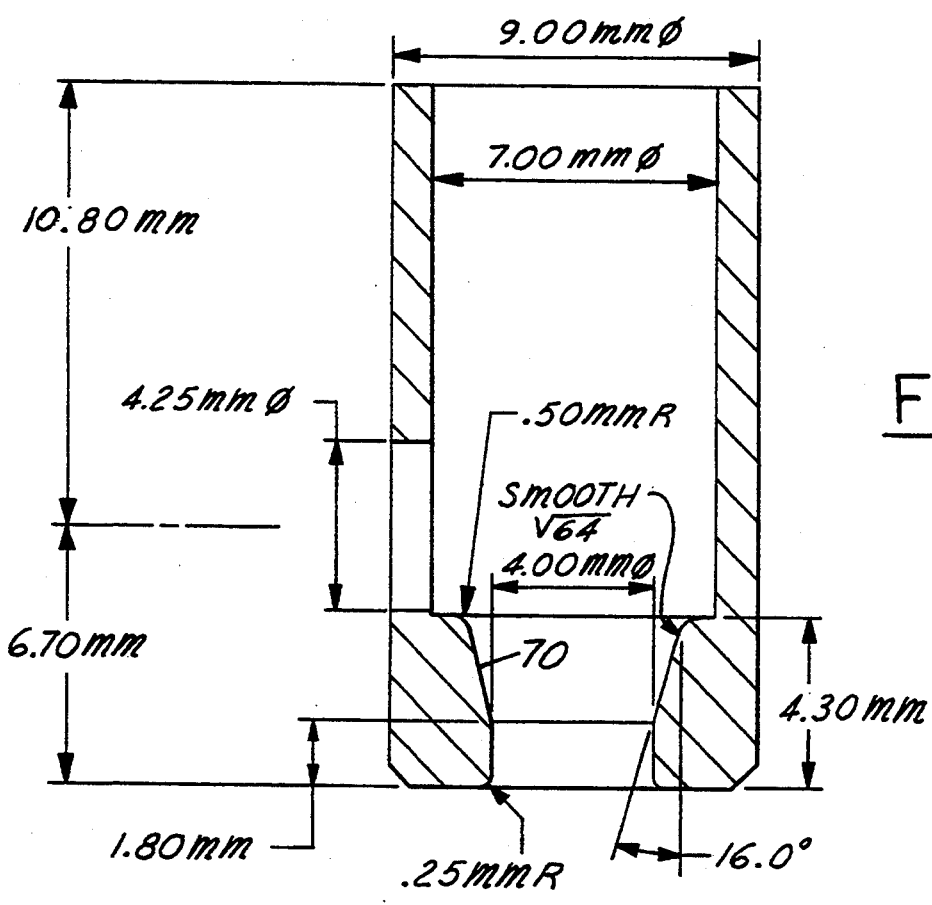
FIG. 4 is an enlarged view of the valve seat by itself for illustrative purposes.
Figure 5:
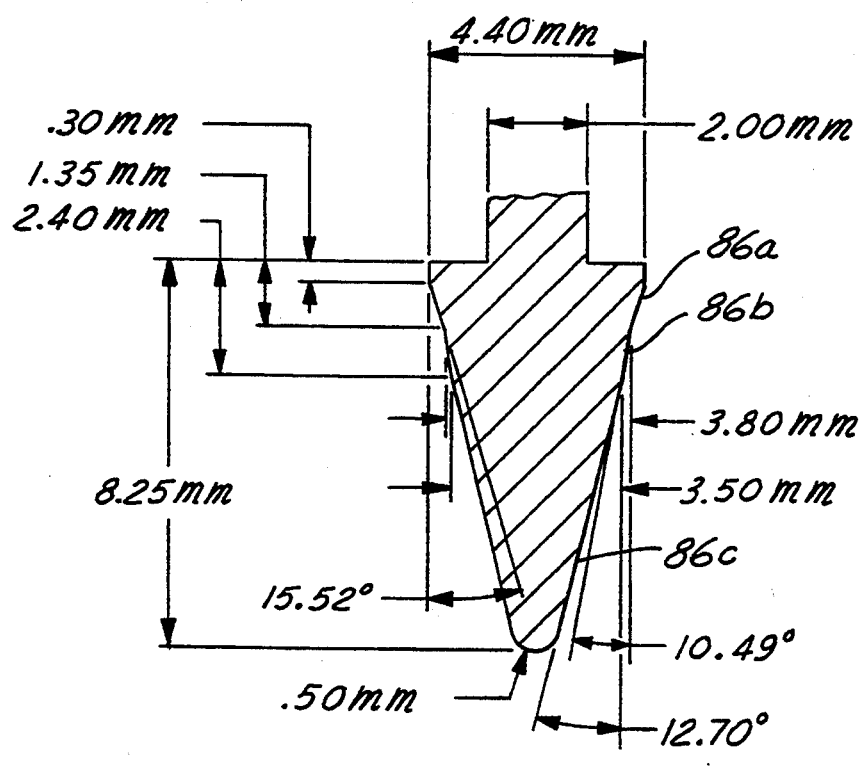
FIG. 5 is an enlarged view of the valve head by itself for illustrative purposes.

Valve seat 70 and valve head 86 are contoured to cause sonic flow through the valve when the valve is open and there is at least a certain positive pressure differential across it, 150 millibars (127 mm Hg) for the present example. The creation of such a choked flow condition makes the valve rather insensitive to variations in manifold vacuum, accomplishing a vacuum regulating function without the inclusion of an additional vacuum regulating valve. FIGS. 4 and 5 disclose dimensional details of an exemplary valve seat and valve head that are effective to cause sonic flow through the valve for positive pressure differential of at least 150 millibars. The frusto-conical seating surface of the valve head is designated 86a, and it is smooth and free of burrs and the like. The included angle of surface 86a is 31.04 degrees. Immediately below surface 86a is another frustoconical surface 86b having an included angle of 20.98 degrees. Below surface 86b is another frusto-conical surface 86c having an included angle of 25.40 degrees. The tip end of the valve head has a 0.50 mm radius. It is believed that the particular dimensions for these tapers and radius are especially important in achieving sonic flow. The included angle of valve seat 70 is 32.00 degrees.

A valve embodying the sonic flow choking principle provides accurate control that is quite insensitive to variations in engine manifold vacuum typically encountered in use. The capability for accurate control when open is accompanied by essentially eliminating leakage when closed. The new valve is an improvement over a known purge valve that comprises a digital solenoid-operated valve and a vacuum regulator because it virtually eliminates objectionable flow pulsations that can cause undesired hydrocarbon spikes in exhaust emissions, it can accomplish accurate non-linear control, particularly at low flows, and it eliminates the need for an additional vacuum regulator valve.

The capability for achieving accurate control when open and avoiding leakage when closed is attained because of various features including: the sonic flow effect; the incorporation of the valve seat and the guide in a single part; the fact that the interface between the valve member and the bushing comprises lubrous material; the valve head and stem are a single part; by the fact that the valve member is joined with the armature by a joint that allows the armature to move slightly radially so as to be self-centering so that it does not contact the stator structure; and by making the seat area on which the valve head closes, at least approximately the same area as that of the largest diameter of the stem, thus making the valve at least approximately balanced.

Figure 2:
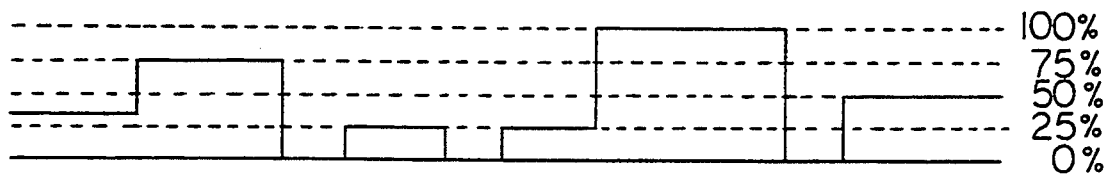
FIG. 2 is an illustrative example of a schedule of operation for the valve.
Figure 3:
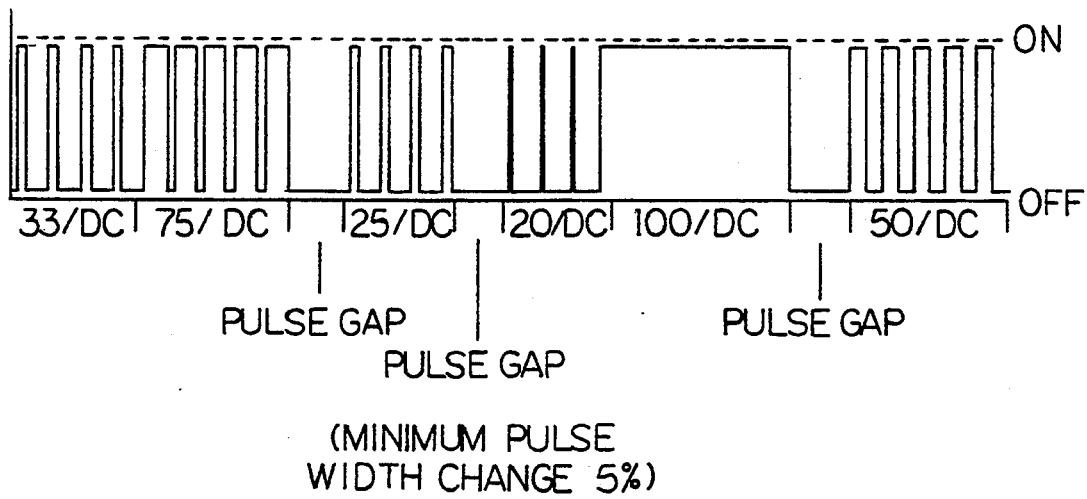
FIG. 3 is an example of a pulse waveform for operating the valve according to a schedule depicted in FIG. 2.

FIGS. 2 and 3 disclose a control strategy for operating the valve in a manner that provides more accurate control, especially when the valve is operated in the direction toward valve closing. FIG. 2 shows an operating mode containing several transitions in the duty cycle. When the duty cycle is to be reduced, a gap is deliberately imposed in the duty cycle waveform. These gaps represent 0% duty cycle. Stated another way, certain decreases in duty cycle are preceded by a deliberate delay before the lower duty cycle is allowed to begin.

While a presently preferred embodiment of the invention has been illustrated and described, it should be appreciated that principles are applicable to other embodiments.

What is claimed is:

1. In a vapor collection system for an internal combustion engine fuel system wherein an electrically-operated canister purge valve disposed between an intake manifold of an engine and a fuel vapor collection canister that collects vapor generated by volatile fuel in a fuel tank controls the purging of said canister to said intake manifold in accordance with a purge control signal that sets the extent to which said canister purge valve allows purge flow, the improvement in which said canister purge valve comprises a one-piece valve member and a one-piece seat and guide member that share a common axis, said valve member comprising a valve head and a valve stem that is coaxial with and extends from said valve head, said seat and guide member comprising a valve seat and a guide that is coaxial with and extends from said valve seat, a bushing disposed on said seat and guide member as a liner for said guide, said valve head being guided for axial motion for seating on and unseating from said seat by the fit of said valve stem with said bushing, valve body means within which said valve seat and said guide are disposed, and means for causing said valve member to be positioned axially relative to said seat and guide member by said purge control signal.

2. The improvement as set forth in claim 1 in which said means for causing said valve member to be positioned includes an armature to which said valve member is attached by means of a joint that permits limited radial movement between them at the attachment so that the armature can be self-centering within the solenoid while said bushing and guide member provide the guidance of the longitudinal motion of both armature and valve member.

3. The improvement set forth in claim 1 including means for operating the valve by means of a duty cycle modulated waveform such that when the valve is to be operated in the direction of closing, a deliberate gap is introduced into the waveform.

4. The improvement set forth in claim 1 in which said valve seat and said valve head have respective axial wall portions that are mutually confronting and are cooperatively configured along the axial extent of their mutual confrontation to cause sonic flow through the purge valve when open and the pressure differential across it exceeds a certain minimum.

5. The improvement set forth in claim 4 in which axial wall portions of said valve seat and said valve head are configured to have tapered shapes that cause such sonic flow.

6. In a vapor collection system for an internal combustion engine fuel system wherein an electrically-operated canister purge valve disposed between an intake manifold of an engine and a fuel vapor collection canister that collects vapor generated by volatile fuel in a fuel tank controls the purging of said canister to said intake manifold in accordance with a purge control signal that sets the extent to which said canister purge valve allows purge flow, the improvement in which said canister purge valve comprises a valve head and a valve seat that are positioned axially relative to each other by said purge control signal to control flow, and said head and seat have respective axial wall portions that are mutually confronting to cause flow through the valve to be sonic flow when the valve is open and the pressure differential across it is in excess of a certain minimum.

7. The improvement set forth in claim 6 in which said valve seat and said valve head are configured to have tapered shapes that cause such sonic flow.

* * * * *